(12) United States Patent
Bounimova et al.

(10) Patent No.: US 8,595,707 B2
(45) Date of Patent: Nov. 26, 2013

(54) PROCESSING PREDICATES INCLUDING POINTER INFORMATION

(75) Inventors: Eleonora O. Bounimova, Redmond, WA (US); Vladimir A. Levin, Redmond, WA (US); Leonardo M. de Moura, Sammamish, WA (US); Thomas J. Ball, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 724 days.

(21) Appl. No.: 12/649,335

(22) Filed: Dec. 30, 2009

(65) Prior Publication Data

US 2011/0161937 A1 Jun. 30, 2011

(51) Int. Cl.
*G06F 17/24* (2006.01)

(52) U.S. Cl.
USPC .............. 717/131; 703/2; 703/22; 714/39; 715/234; 717/104; 717/133

(58) Field of Classification Search
None
See application file for complete search history.

(56) References Cited

U.S. PATENT DOCUMENTS

| | | | |
|---|---|---|---|
| 4,849,810 A | | 7/1989 | Ericsson |
| 6,079,031 A * | | 6/2000 | Haley et al. .................. 714/38.1 |
| 6,125,375 A | | 9/2000 | Atkins et al. |
| 6,904,590 B2 | | 6/2005 | Ball et al. |
| 7,058,925 B2 | | 6/2006 | Ball et al. |
| 7,203,924 B2 | | 4/2007 | Rehof et al. |
| 7,346,486 B2 | | 3/2008 | Ivancic et al. |
| 7,437,666 B2 | | 10/2008 | Ramarao |
| 7,509,534 B2 | | 3/2009 | Rajamani et al. |
| 7,526,750 B2 | | 4/2009 | Andrews et al. |
| 7,536,606 B2 | | 5/2009 | Andrews et al. |
| 7,552,119 B2 | | 6/2009 | Ting |
| 7,555,418 B1 | | 6/2009 | Qadeer et al. |
| 7,587,707 B2 | | 9/2009 | Ball et al. |
| 7,653,520 B2 | | 1/2010 | DeMoura et al. |
| 7,926,039 B2 | | 4/2011 | Wang et al. |
| 8,046,746 B2 * | | 10/2011 | Tillmann et al. .............. 717/133 |
| 8,051,408 B1 | | 11/2011 | Johnson |
| 8,131,532 B2 | | 3/2012 | Cadambi et al. |
| 2002/0178401 A1 | | 11/2002 | Ball et al. |
| 2003/0204570 A1 | | 10/2003 | Rehof et al. |
| 2003/0204641 A1 | | 10/2003 | Rehof et al. |
| 2003/0204834 A1 | | 10/2003 | Ball et al. |
| 2004/0019468 A1 * | | 1/2004 | De Moura et al. ................ 703/2 |

(Continued)

OTHER PUBLICATIONS

Cormac Flanagan et al., Predicate Abstraction for Software Verification , ACM SIGPLAN vol. 37 Issue 1, Jan. 2002, [Retrieved on Aug. 16, 2012]. Retrieved from the internet: <URL: http://dl.acm.org/citation.cfm?id=503291> 12 Pages (191-202).*

(Continued)

*Primary Examiner* — Don Wong
*Assistant Examiner* — Anibal Rivera

(57) ABSTRACT

A system is described for processing predicates in the course of analyzing a program, based on a general-purpose theory of pointers. The system converts location expressions in the predicates into logical formulae that are interpretable by a theorem prover module, producing converted predicates. This conversion associates the location expressions with location objects. More specifically, the conversion represents variables as explicitly-specified location objects, and location terms (such as a field-type access terms and dereference-type terms) as constructor-specified location objects. The theory of pointers is also expressed by a set of axioms which constrain the operation of the theorem prover module.

20 Claims, 8 Drawing Sheets

(56) References Cited

U.S. PATENT DOCUMENTS

| | | | |
|---|---|---|---|
| 2005/0086648 | A1 | 4/2005 | Andrews et al. |
| 2005/0149904 | A1 | 7/2005 | Ball et al. |
| 2005/0166167 | A1* | 7/2005 | Ivancic et al. ............... 716/5 |
| 2005/0229044 | A1 | 10/2005 | Ball |
| 2005/0235257 | A1 | 10/2005 | Ball et al. |
| 2005/0257098 | A1 | 11/2005 | Andrews et al. |
| 2006/0247907 | A1* | 11/2006 | Qadeer et al. ............... 703/22 |
| 2006/0248515 | A1 | 11/2006 | Qadeer et al. |
| 2006/0282807 | A1 | 12/2006 | Ivancic et al. |
| 2007/0005633 | A1 | 1/2007 | Ball et al. |
| 2007/0168981 | A1 | 7/2007 | Pacheco et al. |
| 2007/0244942 | A1 | 10/2007 | McCamant et al. |
| 2007/0250471 | A1 | 10/2007 | Fontoura |
| 2007/0271204 | A1 | 11/2007 | Jiang |
| 2008/0016497 | A1 | 1/2008 | Wang et al. |
| 2008/0034353 | A1 | 2/2008 | Rajamani et al. |
| 2008/0104665 | A1 | 5/2008 | Naldurg et al. |
| 2008/0109641 | A1 | 5/2008 | Ball et al. |
| 2008/0114975 | A1 | 5/2008 | Yen |
| 2008/0120321 | A1 | 5/2008 | Liu |
| 2008/0195999 | A1 | 8/2008 | Cohen et al. |
| 2008/0209389 | A1* | 8/2008 | Baumgartner et al. ....... 717/104 |
| 2008/0215701 | A1 | 9/2008 | Holt |
| 2008/0229261 | A1* | 9/2008 | Rajamani et al. ............... 716/5 |
| 2008/0244380 | A1* | 10/2008 | Ruellan ............... 715/234 |
| 2008/0244539 | A1 | 10/2008 | Rajamani et al. |
| 2009/0006463 | A1 | 1/2009 | Mehra et al. |
| 2009/0007038 | A1 | 1/2009 | Wang et al. |
| 2009/0144698 | A1 | 6/2009 | Fanning et al. |
| 2009/0282289 | A1 | 11/2009 | Nori et al. |
| 2010/0005454 | A1 | 1/2010 | Sankaranarayanan et al. |
| 2011/0088016 | A1 | 4/2011 | Ball et al. |

OTHER PUBLICATIONS

Laura Kovacs et al., Finding Loop Invariants for Programs over Arrays Using a Theorem Prover, 2009, [Retrieved on Aug. 16, 2012]. Retrieved from the internet: <URL: http://www.springerlink.com/content/q770371155363214/> 16 Pages (470-485).*

Edmund Clarke et al., SATABS: SAT-Based Predicate Abstraction for ANSI-C, 2005, [Retrieved on Apr. 5, 2013]. Retrieved from the internet: <URL: http://link.springer.com/content/pdf/10.1007%2F978-3-540-31980-1_40> 5 Pages (570-574).*

Manuvir Das et al., ESP:Path-Sensitive Program Verification in Polynomila Time, May 2002, [Retrieved on Apr. 5, 2013]. Retrieved from the internet: <URL: http://dl.acm.org/citation.cfm?id=512538> 12 Pages (57-68).*

Thomas Bell et al.,Zap: Automated Theorem Proving for Software Analysis, 2005, [Retrieved on Apr. 5, 2013]. Retrieved from the internet: <URL: http://link.springer.com/content/pdf/10.1007%2F11591191_2> 21 Pages (2-22).* de Moura, L., et al., "Z3: An Efficient SMT Solver," in *Tools and Algorithms for the Construction and Analysis of Systems*, vol. 4963/2008, Apr. 3, 2008, pp. 337-340.

Manevich, R. et al.; "PSE: Explaining Program Failures via Postmortem Static Analysis"; SIGSOFT04/FSE-12; Oct. 31-Nov. 6, 2004; Newport Beach, CA; 10 pages.

Schmidt, D.; "Program Analysis: Foundations of Abstract Interpretation"; Lecture 4; NYU; Spring 2004; 37 pages.

Schmidt, D. et al.; "Program Analysis as Model Checking of Abstract Interpretations"; 1998; 30 pages.

Diao, Y. et al.; "Path Sharing and Predicate Evaluation for High-Performance XML Filtering"; ACM Trans. Database Syst.; vol. 28, No. 4; Dec. 2003; pp. 467-516.

Ball, et al., "Refining Approximations in Software Predicate Abstraction," in TACAS 04: Tools and Algorithms for Construction and Analysis of Systems, Springer-Verlag, 2004, accessed at <<http://research.microsoft.com/en-us/um/cambridge/projects/terminator/tacas04.pdf>>, 16 pages.

Ball, et al., "Automatically Validating Temporal Safety Properties of Interfaces," Proceedings of the 8th International SPIN workshop on Model Checking of Software, 2001, accessed at <<http://eprints.kfupm.edu.sa/27660/1/27660.pdf>>, 10 pages.

Stokely, et al., "Parallel Assignments in Software Model Checking," Electronic Notes in Theoretical Computer Science, vol. 157, 2006, accessed at <<http://www.comlab.ox.ac.uk/Joel.Ouaknine/publications/parallel05.pdf>>. 17 pages.

Ball, et al., "Boolean Programs: A Model and Process for Software Analysis," Microsoft Research Technical Report, MSR-TR-2000-14, Microsoft Corporation, Redmond, WA, accessed at <<http://research.microsoft.com/pubs/69750/tr-2000-14.pdf>>, 31 pages.

Ball, et al., "Zapato: Automatic Theorem Proving for Predicate Abstraction Refinement," Lecture Notes in Computer Science, No. 3114, accessed at <<http://research.microsoft.com/en-us/um/cambridge/projects/terminator/cav04.pdf>>, 4 pages.

"Microsoft Research SLAM project page", provided by Microsoft Corporation of Redmond, WA, accessed at <<http://research.microsoft.com/en-us/projects/slam/>>, accessed on Dec. 29, 2009, 3 pages.

Ball, et al., "SLAM and Static Driver Verifier: Technology Transfer of Formal Methods inside Microsoft," accessed at <<ftp://ftp.research.microsoft.com/pub/tr/tr-2004-08.pdf>>, Microsoft Research Technical Report, MSR-TR-2004-08, Microsoft Corporation, Redmond, WA, Jan. 28, 2004, 22 pages.

Cook, et al., "Terminator: Beyond Safety," Proceedings of the 18th International Conference on Computer Aided Verification, 2006, accessed at <<http://research.microsoft.com/en-us/um/cambridge/projects/terminator/terminator_tool.pdf>>, 4 pages.

Ball, et al., "The SLAM Project: Debugging System Software via Static Analysis," ACM SIGPLAN Notices, vol. 37, Issue 1, Jan. 2002, accessed at <<http://www.cs.ucdavis.edu/~hchen/teaching/ecs289m-f04/paper/popl02.pdf>>, 3 pages.

Ball, et al., "Thorough Static Analysis of Device Drivers," ACM SIGOPS Operating Systems Review, vol. 40, Issue 4, 2006, accessed at <<http://www.cs.kuleuven.ac.be/conference/EuroSys2006/papers/p73-ball.pdf>>, pp. 73-86.

Ball, et al., "Checking Temporal Properties of Software with Boolean Programs," Proceedings of the Workshop on Advances in Verification, 2000, accessed at <<http://eprints.kfupm.edu.sa/29667/f>>, 13 pages.

Godefroid, et al., "Automated Software Testing Using Program Analysis," IEEE Software, vol. 25, Issue 5, Sep. 2008, accessed at <<http://research.microsoft.com/pubs/74119/ieeesw2008.pdf>>, 8 pages.

Beckman, et al., "Proofs from Tests," Proceedings of the 2008 International Symposium on Software Testing and Analysis, 2008, accessed at <<http://research.microsoft.com/pubs/74120/fp0007-beckman.pdf>>, 11 pages.

"Z3 SMT Solver, documentation page", Microsoft Corporation, Redmond, WA, accessed at <<http://research.microsoft.com/en-us/um/redmond/projects/z3/>>, accessed on Dec. 29, 2009, 3 pages.

Ball, Thomas, "Formalizing Counterexample-Driven Refinement with Weakest Preconditions," Microsoft Research Technical Report, MSR-TR-2004-134, Microsoft Corporation, Redmond, WA, Dec. 10, 2004, accessed at <<http://research.microsoft.com/pubs/70121/tr-2004-134.pdf>>, 20 pages.

Beyer, et al., "The Software Model Checker Blast: Applications to Software Engineering," International Journal on Software Tools for Technology Transfer, vol. 9, Issue 5, 2007, accessed at <<http://www.sosy-lab.org/~dbeyer/Publications/2007-STTT.The_Software_Model_Checker_BLAST.pdf>>, pp. 505-525.

Ball, et al., "Boolean and Cartesian Abstractions for Model Checking C Programs," Microsoft Research Technical Report, MSR-TR-2000-115, Microsoft Corporation, Redmond, WA, Dec. 5, 2000, accessed at <<http://research.microsoft.com/pubs/69821/tr-2000-115.pdf>>, 19 pages.

Ball, et al., "Automatic Predicate Abstraction of C Programs," ACM SIGPLAN Notices, vol. 36, Issue 5, 2001, retrieved at <<http://www.cs.ucla.edu/~todd/research/pldi01.pdf>>, 11 pages.

Ball, et al., "SLIC: A Specification Language for Interface," Microsoft Research Technical Report, MSR-TR-2001-21, Microsoft Corporation, Redmond, WA, Jan. 10, 2002, accessed <<http://research.microsoft.com/pubs/69906/tr-2001-21.pdf>>, 12 pages.

(56) References Cited

OTHER PUBLICATIONS

Ball, et al., "Bebop: A Symbolic Model Checker for Boolean Programs," Proceedings of the 7th International SPIN Workshop on SPIN Model Checking and Software Verification, 2000, accessed at <<http://spinroot.com/spin/Workshops/ws00/18850115.pdf>>, 20 pages.

"Microsoft Havoc home page", Microsoft Corporation, Redmond, WA, accessed at <<http://research.microsoft.com/en-us/projects/havoc/>>, accessed on Dec. 29, 2009, 2 pages.

Ball, "The Slam Toolkit", Proceedings of the 13th International Conference on Computer Aided Verification, Jul. 18-22, 2001.

* cited by examiner

ILLUSTRATIVE TRANSLATION RULES

| LOCATION EXPRESSIONS | | LOGICAL FORMULAE |
|---|---|---|
| VARIABLE v | → | A BASIC LOCATION |
| x* | → | S(x',D) |
| x.f | → | S(x',f') |
| x→f | → | S(S(x', D), f') |

FIG. 3

CODE-RELATED TERMS

- PROGRAM CODE OF ANY TYPE
    - PREDICATES ASSOCIATED WITH THE PROGRAM CODE
        - LOCATION EXPRESSIONS IN PREDICATES
            - EXPRESSION TERMS IN LOCATION EXPRESSIONS
                - VARIABLES (x)
                - LOCATION TERMS
                    - ARRAY-TYPE ACCESS TERMS (x[f])
                    - DIRECT FIELD TYPE ACCESS TERMS (x.f)
                    - INDIRECT FIELD TYPE ACCESS TERMS (x→f)
                    - DEREFERENCE-TYPE TERMS (*x)

• FIELD-TYPE ACCESS TERMS

LOCATION-RELATED TERMS

- LOCATION OBJECTS (L)
    - NORMAL LOCATION OBJECTS ($L_1$)
        - BASIC LOCATION OBJECTS ($L_B$)
        - FIELD-TYPE (AGGREGATE) LOCATION OBJECTS ($L_F$)
        - IMPLICIT LOCATION OBJECTS ($L_P$)
    - ABNORMAL "LOCATION OBJECTS" ($L_2$)

• EXPLICITLY-SPECIFIED LOCATION OBJECTS (CREATE THE BASIC LOCATION OBJECTS)

• CONSTRUCTOR-SPECIFIED LOCATION OBJECTS (THROUGH RECURSIVE APPLICATION, CAN CORRESPOND TO ANY OBJECT ABOVE)

FIG. 4

PROCESSING PREDICATES INCLUDING POINTER INFORMATION

BACKGROUND

Static analysis involves analyzing a program without actually dynamically testing the program through execution. For example, static analysis may determine if there are errors in the program without run-time testing the program. In other cases, static analysis can be combined with run-time testing. For example, a dynamic control system can use static analysis to direct run-time testing.

Typically, static analysis involves the symbolic evaluation of a set of predicates. Predicates represent relations between variables, properties, etc. The predicates may pertain in various ways to the program being analyzed. For example, some predicates can be extracted directly from the program, e.g., from conditional statements (e.g., "IF" statements) in the program. Other predicates can be computed using various types of transformations applied to program statements.

Static analysis may rely on a theorem prover to analyze the identified predicates. A theorem prover typically accepts input information expressed in a specified format, as determined by a background theory. The theorem prover performs logical analysis on the input information in the symbolic domain to produce a conclusion. For example, in one case, the theorem prover can determine whether there is a contradiction in a set of predicates; if so, this means that the conjunction of all predicates yields FALSE for any values for predicate variables. Some theorem provers analyze the input information with reference to constraints specified by axioms. Axioms may be regarded as domain-specific predicates a priori assumed as yielding TRUE. In general, predicate evaluation is a complex task, particularly when dealing with a large number of predicates or complex predicates. As a result, in designing a physical implementation of such analysis, it is appropriate to keep in mind temporal and memory limitations that may affect performance of the implementation.

A predicate that contains pointer information relates some term in the predicate to a memory location. To facilitate automatic analysis of such predicates, it is appropriate to convert such pointer information into a form that can be readily interpreted by a theorem prover. However, there is currently no fully adequate theory for expressing such pointer information. One known approach uses precise axioms that reflect a physical memory model of a programming language (e.g., by mapping any pointer-based computation to an array-based computation). While being precise, this method is computationally complex and may not easily scale for large program code. Another approach uses pointer axioms that attempt to approximate a logical memory model, with the core axiom being Dereference(Address(x))==x. This approach scales well, but it is not precise, e.g., because it does not take into account various scenarios, such as semantically incorrect pointer dereferences (which can result from programs that are incorrect). To address this shortcoming, the approach uses various work-around patches.

The lack of an adequate theory for pointers can have various negative consequences. For example, this deficiency can lead to analysis that includes unsound results, such as incorrect or incomplete results. Further, the deficiency can result in poor performance of a program analysis engine, e.g., by consuming too much memory and/or time. Further, the lack of an adequate theory can result in poor integration of predicate analysis functionality with other aspects of the program analysis engine, which, in turn, may also negatively impact accuracy and performance.

SUMMARY

A system is described for processing predicates that include pointer information based on a general-purpose theory of pointers. The system operates by receiving at least one predicate that is identified during analysis of a program. The predicate includes a location expression associated therewith, which may include a variable and/or a location term (e.g., field-type access term or a dereference term). The system uses at least one translation rule to convert the location expression into a logical formula that is interpretable by a theorem prover module, producing a converted predicate. The system then passes the converted predicate to the theorem prover module for analysis (along with other converted predicates).

According to one illustrative aspect, a logical formula identifies a location object that has an address object and value object associated therewith. In one case, the location object comprises an explicitly-specified location object that corresponds to a variable in the location expression.

In another case, the location object comprises a constructor-specified location object that corresponds to a location term in the location expression. The constructor-specified location object is represented by a constructor function $S(X, C)$, where C refers to a link that relates a parent location object X to the constructor-specified location object. In one case, the link C can correspond to a dereference link (D), associated with a dereference-type term. In another case, the link C can correspond to a field index (F), associated with a field-type access term.

According to another illustrative aspect, the system operates by first determining explicitly-specified location objects, also referred to as basic location objects. The system then determines constructor-specified location objects in a recursive fashion.

According to another illustrative aspect, an explicit encoding technique can be used to represent locations associated with variables, and field selectors, using integers; an uninterpreted function can be used to represent other entities (e.g., other location objects, address objects, and value objects).

According to another illustrative aspect, each location object is associated with either a normal location object or an abnormal location object, the abnormal location object representing an invalid location.

According to another illustrative aspect, the operation of the theorem prover module is constrained by a set of axioms associated with the theory of pointers. In one case, the theorem prover module receives an explicit set of axioms. In another case, the theorem prover module receives converted predicates which implicitly incorporate constraints specified by a set of axioms.

According to another illustrative feature, the set of axioms represents a relatively small set of core axioms. The theorem provider module is operative to infer additional details based on the core set of axioms.

In general, the functionality summarized above offers sound results and satisfactory performance, even in the course of analyzing a large set of predicates and/or complex predicates. The functionality also provides an elegant way of encompassing many different pointer scenarios, including semantically incorrect pointer dereferences. The functionality also readily accommodates the integration of predicate processing functionality with other aspects of a program analysis engine.

The above functionality can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 shows a collection of translation rules used by the conversion module to transform location expressions into logical formulae.

FIG. 4 shows taxonomies of syntactic and semantic terms used in this explanation.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth functionality for processing location expressions in predicates based on a general-purpose theory of pointers. Section A of this disclosure describes an illustrative system for performing this analysis. Section B describes the operation of the system of Section A in flowchart form. Section C describes illustrative computing functionality for implementing the features described in Sections A and B.

Figure 9:
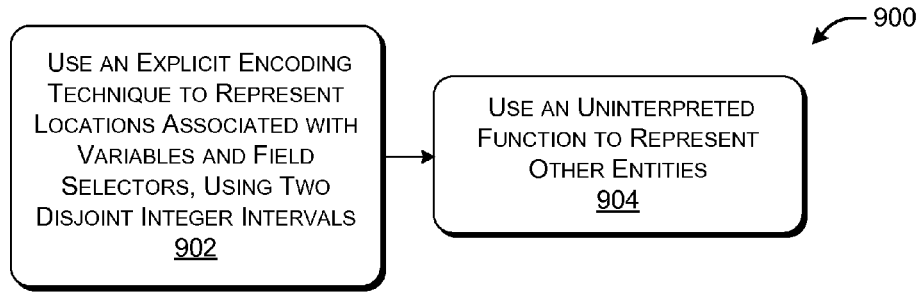
FIG. 9 is a flowchart that describes on implementation-specific formulation of the theory of pointers.

As a preliminary matter, some of the figures describe concepts in the context of one or more structural components, variously referred to as functionality, modules, features, elements, etc. The various components shown in the figures can be implemented in any manner, such as by hardware, software-implemented electrical components, and/or some combination thereof In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 9, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" encompasses any way that any kind of functionality can be constructed to perform an identified operation. The terms "logic" or "logic component" encompass any functionality for performing a task. For instance, each operation illustrated in the flowcharts corresponds to a logic component for performing that operation. When implemented by a computing system (e.g., "computing functionality"), a logic component represents a physical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative System

A.1. Overview of System

Figure 1:
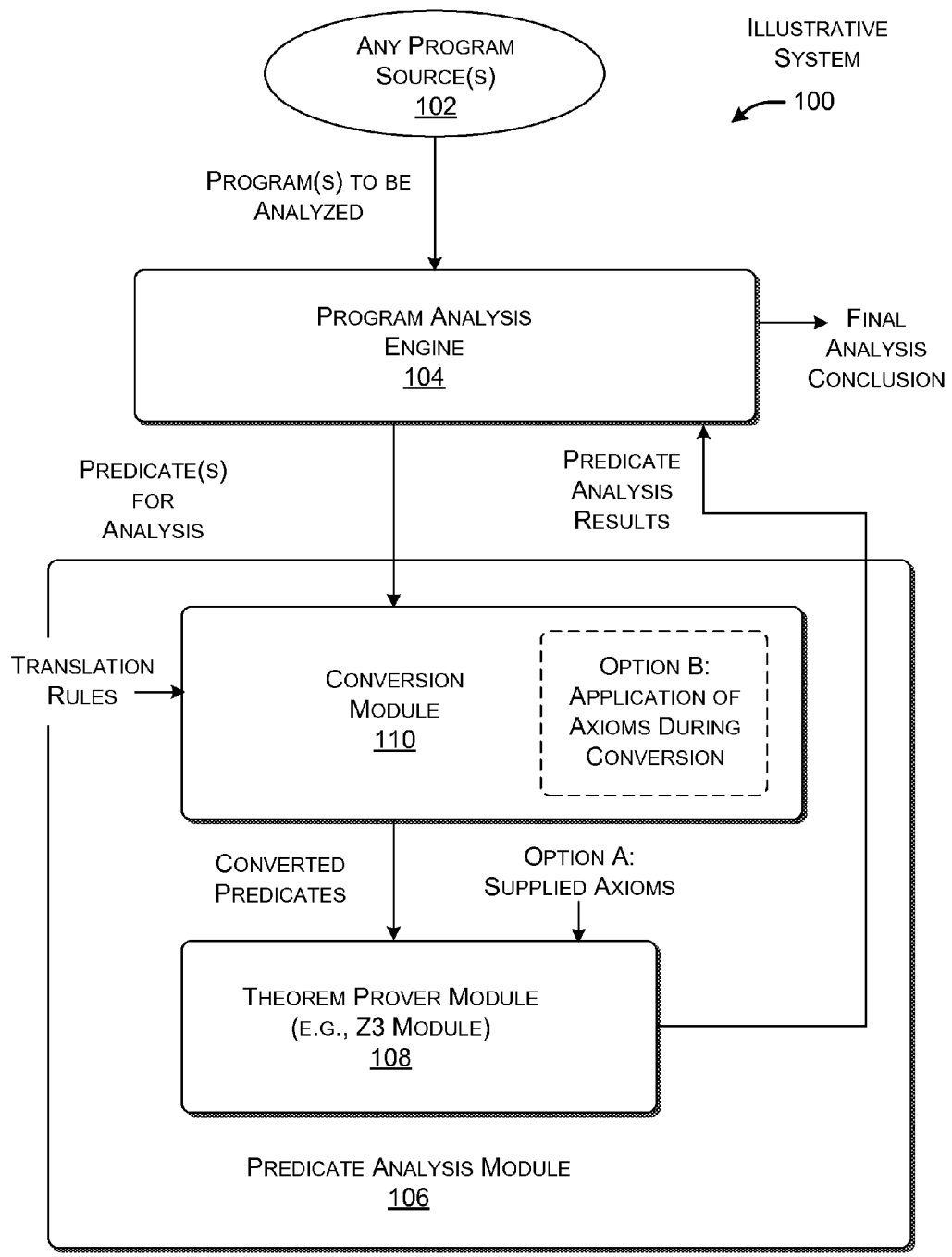
FIG. 1 shows an overview of a system for analyzing a program, including a predicate analysis module for analyzing predicates; the predicates are identified in the course of analyzing the program.

FIG. 1 shows a system for performing analysis on a program, and, in the process, for analyzing predicates. As stated above, predicates represent relations between variables, properties, etc. The predicates may pertain in various ways to the program being analyzed. For example, some predicates can be extracted directly from the program, e.g., from conditional statements (e.g., "IF" statements) in the program. Other predicates can be computed using various types of transformations applied to program statements. For example, the weakest pre-condition transformation associated with assignment x:=y transforms post-condition x==1 into pre-condition y==1.

The program being analyzed may originate from one or more program sources 102 (referred to in the singular below). For example, the program source 102 may correspond to source code, binary code, intermediate representation (IR) code, execution traces associated with the program, and so on.

Figure 5:
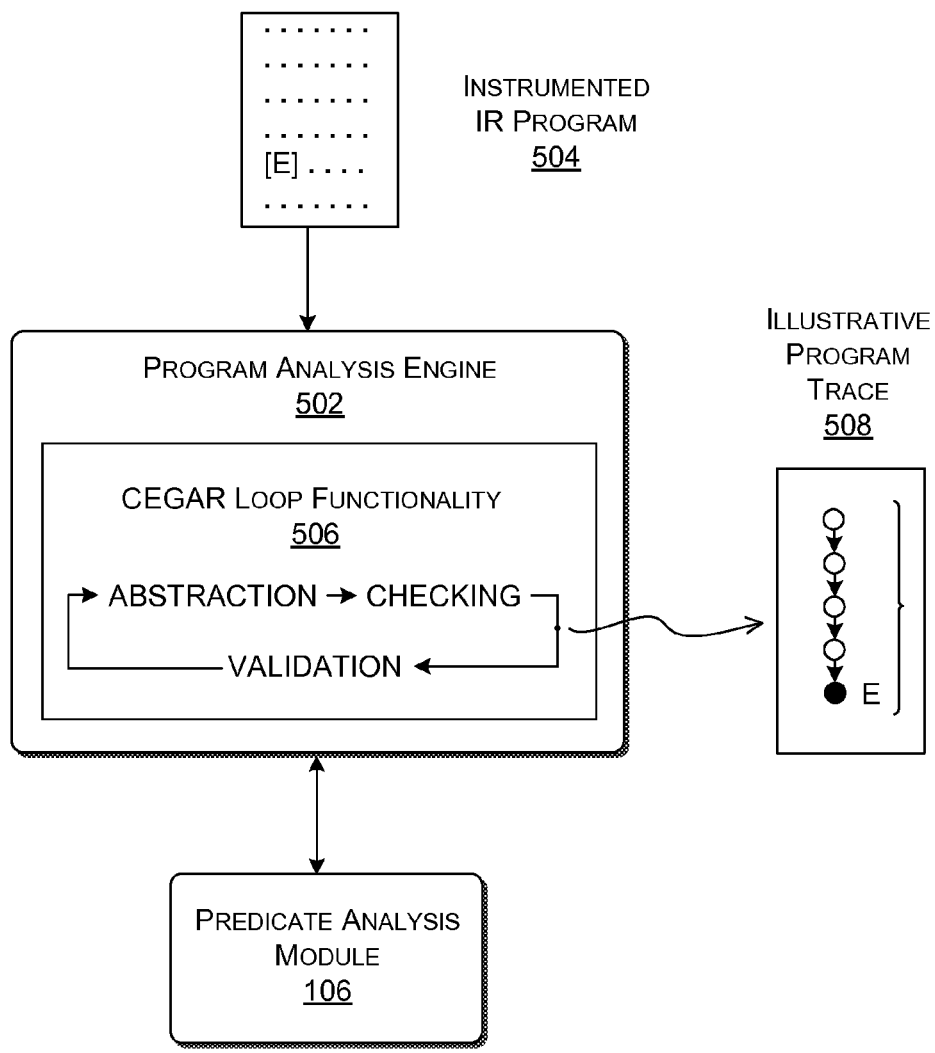
FIG. 5 shows an overview of a program analysis engine that can make use of the predicate analysis module of FIG. 1.
Figure 6:
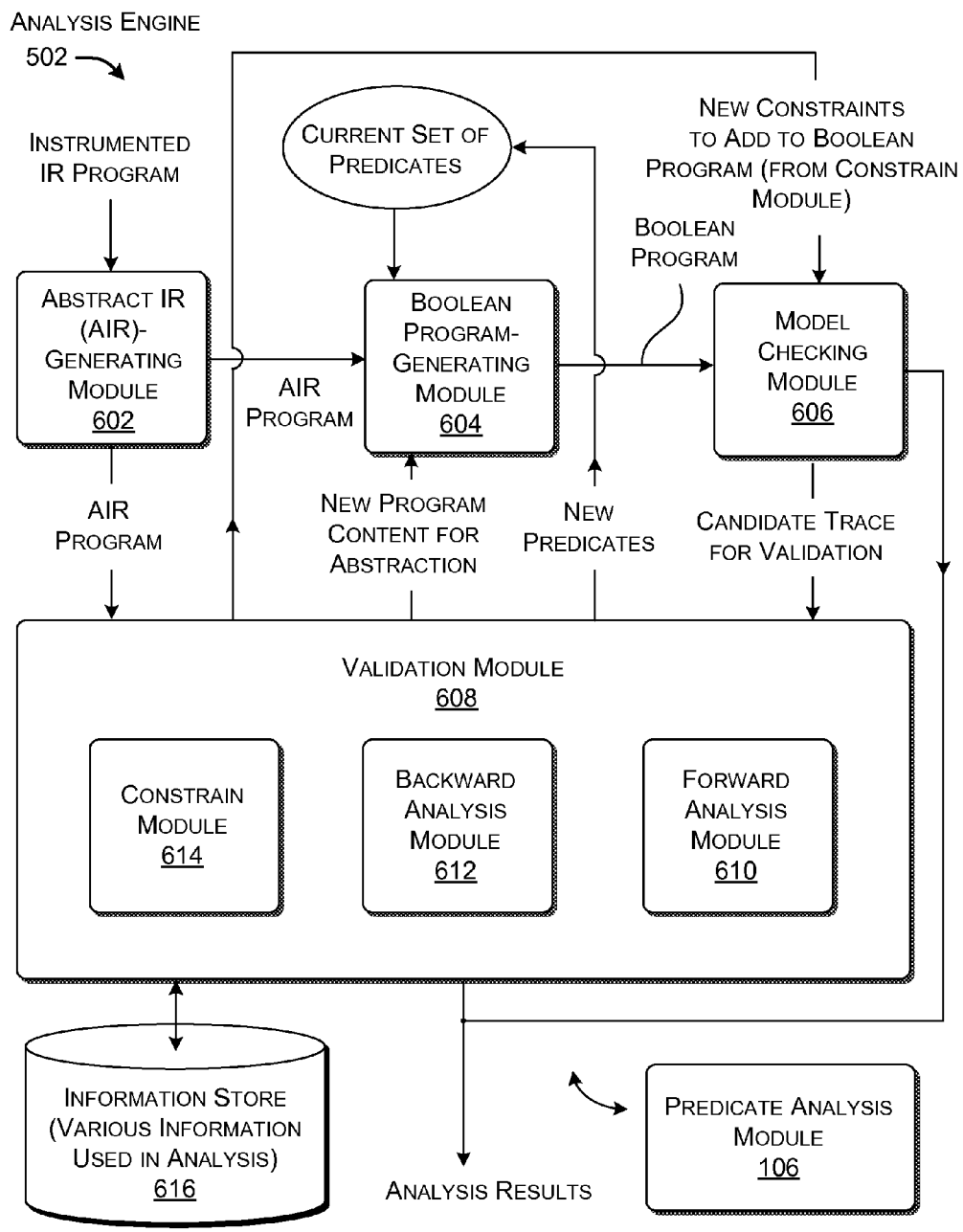
FIG. 6 is a more detailed depiction of the program analysis engine of FIG. 5.

A program analysis engine 104 performs static analysis on the program, in possible combination with other types of analyses. As stated above, static analysis involves analyzing a program without actually dynamically testing the program through execution. The static analysis may attempt to discover a property of the program, such as, most commonly, whether the program includes any errors. FIGS. 5 and 6, to be discussed in turn, show one example of a program analysis engine that can be used in the system 100 of FIG. 1.

The evaluation of predicates serves various purposes. According to one application, the program analysis engine 104 evaluates a set of predicates to determine whether there is a contradiction in the set. If so, this means that the conjunction of all predicates yields FALSE for any values for predicate variables. Otherwise, the evaluation may reveal that that the set of predicates is VALID. If this is the case, the evaluation can also return a model, which provides a set of values of predicate variables for which all predicates yield TRUE. In another case, the program analysis engine 104 can rely on predicate analysis to detect a minimal subset of predicates that exhibits contradiction. The program analysis engine 104 can rely on predicate analysis for yet other purposes.

The program analysis engine 104 relies on a predicate analysis module 106 to perform the evaluation of predicates. The predicate analysis module 106, in turn, includes two component modules: a theorem prover module 108 and a conversion module 110.

The theorem prover module 108 represents functionality for logically analyzing input information to reach a conclusion. More specifically, the input information is expressed as a formula that can be interpreted by the theorem prover module 108. The theorem prover module 108 attempts to find a solution to the formula within a symbolic domain, essentially solving an oftentimes-complex combinatorial problem defined by multiple constraints.

Different types of general-purpose theorem prover modules are available in the field. For example, the Z3 theorem prover, provided by Microsoft Corporation of Redmond, Wash., can be used to implement the theorem prover module 108 of FIG. 1. The Z3 theorem solver is described in various publications, including: Leonardo de Moura, et al., "Z3: An Efficient SMT Solver," in *Tools and Algorithms for the Construction and Analysis of Systems*, Vol. 4963/2008, Apr. 3, 2008, pp. 337-340. Other theorem prover modules include: Alt-Ergo, Ario, Barcelogic, Beaver, Boolector, CVC, CVC Lite, CVC3, DPT (Intel), ExtSAT, Harvey, HTP, ICS (SRI), Jat, MathSAT, OpenSMT, Sateen, Simplify, Spear, STeP, STP, SVC, Sword, TSAT, UCLID, etc.

The conversion module 110 receives predicates from the program analysis engine 104. The predicates have location expressions associated therewith, and each location expression may include one or more expression terms. An expression term, in turn, can specify either a variable (e.g., x) or a so-called location term. A location term may represent a direct field type access term (e.g., x,f), an indirect field type access term (e.g., x→f), an array-type access term (e.g., x[f], a dereference-type term (e.g., *x), etc. In any case, the location expression includes or otherwise implicates some type of pointer information which relates some expression term to a location. Generally, a legitimate pointer points to a location (in which case, the pointer's value is the location address) or keeps 0 as its value. A dereference-type term returns the current value stored in the location that this pointer points to.

The conversion module 110 operates by converting the location expressions in the predicates to logical formulae that are interpretable by the theorem prover module 108. It performs this task by using various translation rules. The translation rules map different types of expression terms found in the location expressions into corresponding logical form. The conversion module 110 is said to produce converted predicates according to the terminology used herein. After conversion, the conversion module 110 passes the converted predicates to the theorem prover module 108 for analysis.

The theorem prover module 108 processes the converted predicates subject to a set of axioms. Axioms may be regarded as domain-specific predicates a priori assumed as yielding TRUE. The axioms can be provided to the theorem prover module 108 according to different modes. According to mode A, the system 100 feeds an explicit set of axioms to the theorem prover module 108. The theorem prover module 108 then takes these axioms into account as it processes the set of converted predicates. Effectively, the set of axioms acts as constraints which influence the determination of a solution by the theorem prover module 108 (if, in fact, a solution can be identified). The Z3 theorem prover, for instance, accommodates this mode of operation. According to mode B (also referred to as an "eager expansion" mode), the axioms are incorporated into the conversion operation performed by the conversion module 110. That is, the conversion module 110 applies the set of axioms when producing the converted predicates, effectively instantiating those axioms in the course of its conversion operation. The converted predicates therefore implicitly incorporate the constraints associated with the axioms; these constraints also indirectly influence the solution generated by the theorem prover module 108. But in mode B, the theorem prover module 108 does not receive and process separate axioms. In yet another case, some of the axioms can be applied according to mode A and some of the axioms can be applied according to mode B.

According to one particular implementation, the set of axioms represents a small (e.g., minimal) set of axioms. The theorem prover module 108 can infer additional details based on this core set of axioms. For example, the theorem prover module 108 can infer the existence of abnormal location objects on the basis of the axioms, even though the axioms do not explicitly define such objects. This characteristic is advantageous, since it reduces the complexity of the design and potentially improves it performance, while still providing sound output results.

The theorem prover module 108 generates predicate analysis results which reflect it conclusions. The program analysis engine 104 receives the predicate analysis results and ultimately generates a final analysis conclusion on the basis of the results. In one case, after several iterations of analysis, the program analysis engine 104 identifies whether or not the program being analyzed contains errors.

The translation rules together with the set of axioms express a general theory of pointers. In other words, the translation rules and axioms provide a conceptual framework for converting location expressions in the predicates into a form that is readily interpretable by the theorem prover module 108. This conceptual framework is based on a logical treatment of pointers and locations, rather than, primarily, a physical model of memory. As will be described, the theory of pointers presents a uniform and elegant approach to represent different types of pointer information presented in the location expressions. The theory offers accurate results without unduly taxing the system 100, e.g., without consuming unacceptable amounts of memory resources and time. The theory also readily allows the predicate analysis module 106 to be integrated with the program analysis engine 104, especially in those instances in which the program analysis engine 104 also relies on a logical treatment of pointers and locations (rather than a physical memory model).

A.2. Illustrative Translation Rules

Figure 2:
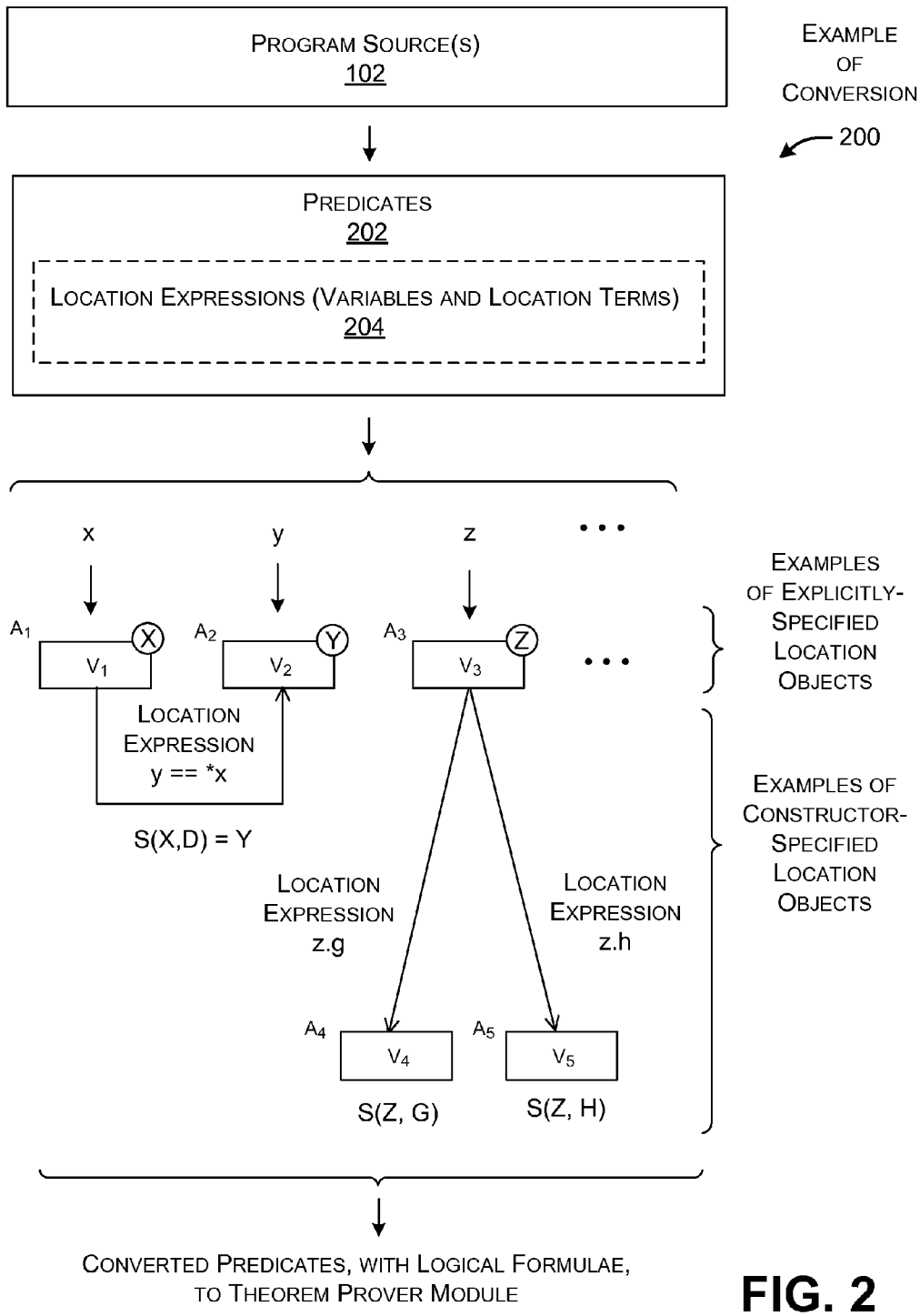
FIG. 2 shows an example of a conversion performed by a conversion module used by the predicate analysis module of FIG. 1; here, the conversion module converts location expressions in the predicates into logical formulae that are interpretable by a theorem prover module.

Advancing to FIG. 2, this figure shows an example 200 of the type of conversion produced by the conversion module 110 of FIG. 1. A host of terms will be developed to describe FIG. 2. FIG. 4 provides a summary of these terms to facilitate the reader's understanding of the ensuing explanation.

To summarize the explanation above, FIG. 2 shows that a collection of predicates 202 can be identified in the course of analyzing a program, where the program originates from the program source 102. The predicates, in turn, include location expressions 204 associated therewith. In general, this explanation uses lower-case letters to denote syntactic entities expressed in the predicates, such as variables and location terms. The explanation uses upper-case letters to denote semantic entities, e.g., abstract objects associated with corresponding syntactic entities.

Assume, for example, that the location expressions include at least three variables: x, y, and z. The conversion module 110 first applies a translation rule which explicitly associates each of these variables with location objects, denoted by location objects X, Y, and Z. The location objects X, Y, and Z are referred to as explicitly-specified location objects because they are explicitly identified by the conversion module 110. These location objects are also referred to as basic location objects.

Next, the conversion module 110 uses a constructor function S(X, C) to represent location objects associated with location terms. To repeat, a location term may represent a direct field type access term (e.g., x,f), an indirect field type access term (e.g., x→f), an array-type access term (e.g., x[f]), a dereference-type term (e.g., *x), etc. The location objects created thereby are referred to as constructor-specified location objects. This is because these locations are specified using the constructor function S(X, C). The constructor function identifies a location object that is linked to a parent location object X via a link C. The link C can be interpreted in different ways, as explained below.

Consider first the case in which a location expression includes the location term z.g. The conversion module 110 associates a dependent or derived location object for this location term, as specified by the constructor function S(Z, G). That is, the constructor function specifies that this dependent location object is linked to parent location object Z via a link G, associated with the field index g. Similarly, a constructor function S(Z, H) specifies that another dependent location object is linked to the parent location object Z via a link H, associated with a field index h. In these cases, the conversion module 110 uses the constructor function S to identify new location objects, referred to herein as field-type location objects. Intuitively, these new objects can be thought of as "child boxes" spawned down from their respective parent location "boxes."

Now consider a case in which the location expression includes a deference-type term, e.g., *x, as in y=*x. The conversion module 110 associates a dependent or derived location object for this location term, as specified by the constructor function S(X, D). The constructor function specifies that this dependent location is linked to the parent location object X via a dereference link D. That is, the dereference link D represents a location object yielded by pointer dereference *x. In this particular case, the conversion module 110 uses the constructor function S to identify a pre-existing basic location object, namely basic location object Y. It is also possible for a dereference term to identify an existing dependent location object, such as the object associated with the location term z.g, which is a field-type location object. It is also possible for a dereference term to identify neither a basic location object nor a field-type location object; in this case, the dereference term can be said, informally, to identify an implicit location object. This is the case, for example, when a predicate includes a function which creates a new memory location, e.g., as is the case with the malloc( ) dynamic memory allocation operation in the C language. In other examples of implicit locations, there is some nexus between a predicate and a function which creates a new memory location, although the predicate may not explicitly include such a function; that is, the predicate can indirectly implicate such a function.

Generally, a location object X can be conceptualized, as stated above, as a box. The box can store a value object, specified by a value function V(X). The value object associated with a location object can change in the course of program's execution, but not in the course of predicate evaluation. That is, the juncture at which predicate analysis is performed can be viewed as a fixed "snapshot" in the execution of the program. The address of the location object X corresponds to an address object, as specified by an address function A(X).

In the above explanation, the various identified entities (locations, addresses, values, links, etc.) are described as objects. An implementation of the system 100 can represent these objects in different ways. For example, as will be described in further detail below, one illustrative implementation of the system 100 can use an explicit encoding technique to represent (a) locations associated with variables and (b) field selectors (described below), using integers; the system 100 can use an uninterpreted function to represent other entities (e.g., other object locations, address objects, and value objects). Generally, it is advantageous to represent objects as integers because the theorem prover module 108 is adept at interpreting logical formulas expressed in terms of integers. In the following discussion, certain aspects of the system 100 will be described in the context of objects and certain aspects will be described in the context of an implementation which encodes the objects in an implementation-specific manner.

As another point of clarification, the conversion module 110 treats field structures in the same manner as arrays. The conversion module 110 also refers to locations in field structures and arrays in the same manner, e.g., as field indices or field selectors. For example, the conversion module 110 can treat a location term of form x[f] (associated with an array) the same as a term of form x.f Accordingly, in the example of FIG. 2, the field-type access terms z.g and z.h may ultimately correspond to field names within a field structure, or they may refer to locations within an array. In view of this uniform treatment, the remainder of this explanation will sometimes refer to structure-type access terms and array-type access terms in the same manner, e.g., as generic field-type access terms which produce field-type location objects. Field-type location objects are also referred to as aggregate-type location objects.

In other words, field-type location objects are specified when the constructor function includes a field index object F as a second parameter, e.g., S(X, F), where $F \in [0 \ldots N-1]$. N refers to a maximal number of field (array) indices associated with aggregate structures in a program. For example, assume that a program uses an array having 5 elements (P=5) and a field structure having 10 fields (P=10); here, N is 10. That is, assume that X is the location that represents the entire array and Y is the location that represents the entire field structure. The field-type locations of this program are S(X, 0) through S(X, 4), and S(Y, 0) through S(Y, 9).

To accommodate this manner of interpretation, the conversion module 110 performs a preliminary conversion operation on certain types of location terms to convert them into a uniform format. For example, the conversion module 110 can transform field names in a field structure into integers in an interval [0 . . . P−1]; here, as said, P is the number of fields in this structure. Further, the conversion module 110 can assume that array indices follow the C language convention in that they define an integer interval that starts with 0; for other programming languages, the conversion module 110 can convert the array index to this C style.

The system 100 can also represent the dereference link D as the value −1 or some other selected value. This means that the constructor function S(X, C) is polymorphic on its second argument; it can refer to either −1 (for a dereference link D) or a range N of non-negative integers [0 . . . N−1] (for a field index F). Hence, $\notin$ [0 . . . N−1].

FIG. 3 summarizes the operation of the conversion module 110 in converting expression terms into logical formulae. The conversion module 110 performs this operation with reference to a collection of translation rules. A first translation rule converts a variable v to a basic location object, also referred to herein as an explicitly-specified location object. A second translation rule converts a dereference-type term (*x) into the constructor function expression S(x', D). Here, x' refers to a replacement term that is applied for term x upon each application of the translation rule in a recursive series of applications, and D refers to a dereference link. A third translation rule converts a direct field access type term (x,f) into the constructor function expression S(x', f'). Here, f' refers to a replacement term for field index f. A fourth translation rule converts an indirect field type access term (x→f) into the constructor function expression S(S(x', D),f'). As will be described below, the conversion module 110 can also apply additional translation rules.

These constructor function expressions can also be expressed in more abstract form in the context of objects. The first translation rule specifies a basic location object, e.g., X. The second translation rule identifies a constructor-specified location object that is represented by S(X, D). The third translation rule identifies a constructor-specified location object that is represented by S(X, F), where F is a field index object. The fourth translation rule identifies a constructor-specified location object that is represented by S(S(X, D), F).

FIG. 4 summarizes syntactic and semantic terms used herein. With reference to the semantic taxonomy, FIG. 4 illustrates a collection of terms used herein to refer to location objects. In actual practice, the system 100 first creates "explicitly-specified" location objects based on variables found in the location expressions, which can be said to correspond to B basic location objects. The system 100 then recursively applies the constructor function S(F, C) to location terms to specify "constructor-specified" location objects. As described above, the link parameter C can correspond to a dereference link D (corresponding to integer −1) or a field index F (corresponding to a range [0 . . . N−1]), where D $\notin$ [0 . . . N−1].

A constructor-specified location object that is created using a field index is referred to as a field-type location object (and is also referred to as an aggregate location object). This location object originates from a field-type access term that ultimately "originates" from either an array or a field structure. On the semantic level, the system 100 is agnostic as to whether a field-type location object "originates" from a field structure or an array.

A constructor-specified location object that is created using a dereference link D can be characterized in different ways. In one case, such a constructor-specified location object corresponds to a basic location object or a field-type location object. For example, in the context of predicate x==*y, dereference *y denotes the same basic location object X as denoted by variable x. In this case, this dereference-type term is said to be aliased with the corresponding variable or field-type access term. In another case, a constructor-specified location object corresponds to neither a basic location object nor a field-type location—in which case it can be informally said to correspond to an implicit location object. In other words, implicit location objects are those which can only be referenced through dereference-type terms. For example, in the C language, the malloc( ) function produces such implicit location objects.

More generally considered, an entire domain of location objects (L) can be said to include a domain $L_1$ of normal location objects which correspond to valid locations. However, upon evaluation, a predicate may contain a term that cannot yield any normal location. For example, if V(x)==0, then S(X, D) cannot yield a normal location upon evaluation. As another example, if a data type of the location X is "int," then S(X, F) cannot yield a normal location. To deal with such predicates, FIG. 4 informally specifies a domain of location objects $L_2$ that can be said to be abnormal. Note that detection of an abnormal location object could signal an error in a program's execution. In some cases, the theorem prover module 108 can detect the presence of abnormal location objects, and in other cases, it cannot; in the latter case, other functionality in the program analysis engine 104 can detect such locations, e.g., by analyzing data type information.

As a final point of clarification, the theory of pointers described herein does not explicitly identify or define all the location objects shown in FIG. 4. Rather it accounts for normal location objects, and it is based on the creation of explicitly-specified location objects (for variables), followed by the recursive application of the constructor function S(F, C) to create constructor-specified location objects. Various conclusions can be derived based on these core assumptions, such that a predicate relates to an abnormal location object, even though the theory does not explicitly define such an entity. In other words, the enumeration of location objects in FIG. 4 is to be understood as an organization of terms used in this explanation to refer to location objects, rather than the express dictates of the theory per se. As described above, the use of a small set of axioms is advantageous because it reduces the complexity of the system 100 and improves its performance.

A.3. Illustrative Axioms

Having described the translation rules, the explanation now advances to the axioms. As explained above, the axioms constrain the operation of the theorem prover module 108, either directly (as a result of being explicitly supplied to the theorem prover module 108) or indirectly (as a result of being applied in the conversion stage to produce the converted predicates). Generally, any axiom can incorporate the address function A(X) and/or the value function V(X). The address function expresses an address object of location object X, while the value function expresses a value object of location object X.

In the axioms below, X and Y refer to two locations, and F and G refer to two field indices. The axioms are specified below in both an abstract formulation (in the context of objects) and in an implementation-specific formulation (in which the entities are represented in a manner that is readily interpretable by a theorem prover module).

In the abstract formulation, X and Y refer to abstract location objects within the domain L. More specifically, variables represent basic location objects in $L_B$. F and G refer to field index objects. D refers to the dereference link.

In the implementation-specific formulation, an explicit encoding technique can be used to encode program variables and field selectors (including array indices), using integers.

Here, there are B program variables. An uninterpreted function can be used to represent other entities. An uninterpreted function is a function that has a name and accepts a number of parameters, but otherwise conveys no other information; a theorem prover can draw meaningful conclusions from logical expressions that include such uninterpreted functions, without knowing the definitions of those functions. More specifically, other locations (besides locations based on variables) can be represented as terms (expressions) by using the uninterpreted function: $S(X, C)$: int×int→int. Addresses can be represented by using the uninterpreted function: $A(X)$: int→int. Values can be represented by using the uninterpreted function: $V(X)$: int→int. The dereference link can be encoded as −1.

The abstract formulation of the axioms is specified below:

| | |
|---|---|
| For all $X \in L_1 : A(X) > 0$ | Axiom 1. |
| For all $X, Y : A(X) = A(Y) \rightarrow X = Y$ | Axiom 2. |
| For all $X, F \in [0 \ldots N-1] : S(X,F) \notin L_B$ | Axiom 3. |
| For all $X : A(S(X,D)) = V(X)$ | Axiom 4. |
| For all $X, Y, F \notin [0 \ldots N-1], G \in [0 \ldots N-1] : S(X,F) = S(Y,G) \rightarrow X = Y \& F = G$ | Axiom 5. |
| For all $X, Y, F \in [0 \ldots N-1] : V(X) = V(Y) \rightarrow V(S(X,F)) = V(S(Y,F))$ | Axiom 6. |

The implementation-specific formulation of the above axioms is specified below:

| | |
|---|---|
| For all $X > 0 : A(X) > 0$ | Axiom 1. |
| For all $X, Y : A(X) = A(Y) \rightarrow X = Y$ | Axiom 2. |
| For all $X, S \geq 0 : S(X,F) > B$ | Axiom 3. |
| For all $X : A(S(X,D)) = V(X)$ | Axiom 4. |
| For all $X, Y, F \geq 0, G \geq 0 : S(X,F) = S(Y,G) \rightarrow X = Y \& F = G$ | Axiom 5. |
| For all $X, Y, F \geq 0 : V(X) = V(Y) \rightarrow V(S(X,F)) = V(S(Y,F))$ | Axiom 6. |

The following explanation provides an interpretation of the axioms specified above.

Axiom 1 specifies that that normal location objects have meaningful addresses.

Axiom 2 specifies that each location object is identified by a respective location address. This axiom allows function $A(X)$ to be injective.

Axiom 3 specifies that constructor function S produces only non-basic location objects for field-type access terms. In other words, the domain of basic location objects and the domain of field-type location objections are disjoint.

Axiom 4 defines semantics of a pointer's value, specifying that a value object of the pointer is equal to the address object of the location object obtained through dereference of the pointer. In case of the abstract formulation, it also follows from this axiom that if the value object of a pointer X is 0, the address object of the location object $S(X, D)$ is also 0, which means that this is an abnormal location object (which follows from axiom 1).

Axiom 5 specifies that two field-type location objects are identical only if they share the same parent location object and the same link from it.

Axiom 6 is a counterpart to axiom 5. It specifies that, if two parent location objects have equal value objects, then the two corresponding child location objects (which are spawned down from the parent location objects via the same field link) also have equal value objects.

The axioms specified above can also be extended or modified to produce additional sets of axioms. Such extended sets can be formulated to achieve various objectives. For example, an extended set of axioms can be produced to improve the performance of predicate evaluation, e.g., to provide faster evaluation of predicates. Alternatively, or in addition, an extended set of axioms can be produced to accommodate additional complexity found in the predicates. For example, new axioms can be produced to address features of a physical memory model. The following explanation provides examples of such modified axioms. The explanation explains the modified axioms in the context of the implementation-specific formulation. However, these modifications can be expressed in abstract form too.

A first set of modified axioms can be used to optimize the performance of the above-identified axioms 2 and 5. (This is because axioms 2 and 5 may markedly contribute to evaluation complexity.) The set of modified axioms varies axiom 2 by adding an inverse of function A (e.g., to provide function $A^{-1}$). The set of modified axioms varies axiom 5 by including the inverse of function S, as applied to the first and second parameters of the function S (e.g., to provide functions $S^{-1}$ and $S^{-2}$, respectively), excluding the dereference link. More generally described, the first set of modified axioms provides at least one inverse function ($A^{-1}$, or $S^{-1}$, or $S^{-2}$) which specifies an inverse operation with respect to a base function (e.g., A or S) that is included in one of the first through sixth axioms. An illustrative first set of modified axioms is specified as follows, where axiom 2a is a modification of axiom 2, and axioms 5a and 5b are modifications of axiom 5.

| | |
|---|---|
| For all $X : A^{-1}(A(X)) = X$ | Axiom 2a. |
| For all $X, F \geq 0 : S^{-1}(S(X,F)) = X$ | Axiom 5a. |
| For all $X, F \geq 0 : S^{-2}(S(X,F)) = F$ | Axiom 5b. |

A second set of modified axioms specifies that the address of a first field in a structure is the same as the address of the structure as a whole. In other words, a first field-type location object associated with a parent location object has an address object which coincides with an address object of the parent location object. For example, this set of axioms would specify that the address of a first element of an array is the same as the entire array. This modification is useful when it is appropriate to take this knowledge into account, e.g., depending on the programming language in which the program is expressed. To implement this modification, axiom 2 (given above) can be replaced or supplemented by the following two modified axioms:

| | |
|---|---|
| For all $X > B : A(X) = A(S(X,0))$ | Axiom 2b. |
| For all $X, Y : Y \neq S(X,0) \rightarrow A(X) = A(Y) \rightarrow X = Y$ | Axiom 2c. |

Another modified axiom specifies the manner in which one element in a structure (such as an array) is related to its following element. In this axiom, the function $T(X, F)$ is defined on pairs (aggregate location object X, field index F) and returns the address shift of the next field F+1 relative to the field F. The axioms may not define the function $T(X, F)$, but can use such a function if it is supplied for a particular implementation. Again, this modification is useful when it is appropriate to take this kind of alignment knowledge into account, e.g., depending on the programming language in which the program is expressed. This axiom can be specified as axiom 7, which supplements the six core axioms described above.

$$\text{For all } F \geq 0, F < N-1 : A(X, F+1) = A(X, F) + T(X, F) \qquad \text{Axiom 7.}$$

Another modified axiom can account for a scenario in which a predicate includes an array-type access term x[k], where k is a variable or location term. If k is a variable, k' refers to an integer that encodes k as a basic location. If k is a location term, k' is translation of k as defined by appropriate translation rules. Then, x[k] is translated to S(x',V(k')). Here, it is also assumed that indices belong to the interval [0 . . . N−1]. Second, a new axiom is added which constrains the results of function V; this is appropriate to distinguish the encoding of dereference link D from the location values (which can now be used as field indices):

$$\text{For all } X > 0 : V(X)/D \qquad \text{Axiom 8.}$$

A.4. Illustrative Program Analysis Engine

FIG. 5 shows a type of program analysis engine 502 which can be used in the system 100 of FIG. 1. This program analysis engine 502 employs static analysis to determine whether an input program satisfies an identified property. FIG. 6 provides a more detailed description of the program analysis engine 502. Copending and commonly assigned U.S. Ser. No. 12/576,253 ("Program Analysis through Predicate Abstraction and Refinement"), filed on Oct. 9, 2009, to Thomas J. Ball et al., also provides additional details regarding various aspects this type of analysis engine. The '253 application is incorporated herein by reference in its entirety.

The program analysis engine 502 may receive an instrumented IR program 504. The instrumented IR program 504 represented an input program that is converted into an intermediate representation (IR) form. The IR program is "instrumented" in the sense that it is modified to investigate a property of interest. In one case, the instrumented IR program 504 can include one or more abort statements or error labels associated with error states in the program, such as the representative error label "E."

The program analysis engine 502 uses CEGAR loop functionality 506 with the objective of determining whether it is possible to reach the error states in the instrumented IR program. Hence, the program analysis engine 502 transforms the error analysis task into a state-reachability problem. In terms of broad outline, the CEGAR loop functionality 506 operates by producing an abstraction of the instrumented IR program 504 with respect to a current set of predicates. The CEGAR loop functionality 506 then operates on the abstraction to determine whether it is possible to reach the previously-defined error states. The CEGAR loop functionality 506 may fail to find a path that leads to the error states, in which case it concludes that the input program obeys the property rule under investigation.

Alternatively, the CEGAR loop functionality 506 can identify an error trace (also referred to as a counter-example) which leads to an error state. FIG. 5 illustrates one such illustrative trace 508 in high-level form. The trace 508 includes program steps which lead to the error state. The trace 508 may possibly represent an infeasible trace because the abstraction typically represents a coarse version of the original input program that does not capture the full complexity of the input program. Because the trace 508 may or may not represent an actual error, it is referred to below as a candidate trace, indicating that the trace 508 will be subject to further investigation.

The CEGAR loop functionality 506 next performs validation to determine whether the candidate trace is a feasible trace (representing a valid error) or an infeasible trace (not representing a valid error). Suppose that the verification component of the CEGAR loop functionality 506 determines that the trace is infeasible because this path leads to a contradiction when analyzed with respect to the instrumented IR program 504. In this case, the CEGAR loop functionality 506 attempts to discover one or more new predicates which account for this inconsistency. The CEGAR loop functionality 506 then produces a new abstraction based on the current set of predicates (which include the newly discovered predicates), followed by a new round of checking and validation.

The CEGAR loop functionality 506 performs this behavior for any number of iterations until it reaches an answer as to whether the input program obeys the property under investigation. Alternatively, in some cases, this task may be undecidable, in which case the program analysis engine 502 terminates without providing a definitive answer.

FIG. 6 shows a more detailed depiction of the program analysis engine 502 introduced in FIG. 5. The program analysis engine 502 includes (or can be conceptualized to include) multiple components that implement the CEGAR loop functionality 506 of FIG. 5.

To begin with, the program analysis engine 502 includes an abstract IR (AIR) generating module 602 ("AIR-generating module"). The AIR-generating module 602 receives the instrumented IR program described above. In response, the AIR-generating module 602 combines groups of statements in the instrumented IR program into respective blocks to produce an abstract IR program (an "AIR program"). Each block may include any number of statements, including a single statement or multiple statements. The remaining parts of the program analysis engine 502 may therefore operate on the program in units of blocks, rather than individual statements.

A Boolean program-generating module 604 performs abstraction on the AIR program with respect to a current set of predicates. The Boolean program-generating module 604 creates an abstraction of the AIR program in the form of a Boolean program. The Boolean program shares the same control flow as the AIR program. But the Boolean program includes only Boolean variables and presents a distillation of the original input program that narrowly focuses on the investigative target at hand. More specifically, each Boolean variable includes a first value which represents True and a second value which represents False.

A model checking module 606 analyzes the Boolean program created by the Boolean program-generating module 604. As summarized above, the model checking module 606 generally attempts to determine whether or not error states (associated with error labels) are reachable within the Boolean program. If the model checking module 606 can conclusively determine that it cannot reach an error, then it indicates that the input program is free from defects (with respect to the property being checked). The model checking module 606 may alternatively generate a candidate error trace, which may represent a feasible or infeasible path that leads to an error state.

A validation module 608 performs a number of functions. First, the validation module 608 operates on the candidate trace identified by the model checking module 606 to determine whether it is feasible or infeasible. More specifically, the validation module 608 attempts to identify at least one point of inconsistency in the IR data computations along the candidate trace. If found, the validation module 608 pronounces the trace infeasible. Second, the validation module 608 attempts to determine actions that can be taken to refute an infeasible trace. The validation module 608 can accomplish this task in various ways, e.g., by discovering new predicates using various techniques, providing new statements to add to the AIR program, providing new constraints that affect the Boolean program, etc.

The CEGAR loop functionality 506 uses the new predicates (if discovered) to improve the precision at which the AIR program is abstracted, thus eliminating the spurious candidate trace in subsequent iterations of the CEGAR loop.

The validation module 608 uses a combination of forward analysis and backward analysis to analyze the candidate trace. A forward analysis module 610 performs the forward analysis and a backward analysis module 612 performs the backward analysis. Forward analysis refers to analysis performed on the steps in the candidate trace (with respect to the AIR program, not the Boolean program), advancing away from the initial state of the program. Backward analysis refers to analysis performed on the steps in the candidate trace, starting from the final state (an error state or an intermediate state) and advancing towards the initial state of the program.

A constrain module 614 generates new constraints to be added to the Boolean program in a next CEGAR iteration. A constraint refers to any information (besides new predicates or program statements) which limits the operation of the model checking module 606. In one implementation, the validation module 608 calls on the constrain module 614 when both the forward analysis module 610 and the backward analysis module 612 recognize the infeasibility of the trace but cannot prove it (by finding new predicates).

An information store 616 represents one or more repositories of information that pertains to the operation of the program analysis engine 502, and, in particular, the operation of the validation module 608. For example, the information store 616 can store interim results provided by the forward analysis module 610 for use by the backward analysis module 612 and/or other components of the program analysis engine 502.

The program analysis engine 502 can call on the predicate analysis module 106 at various stages in its processing. For example, the Boolean program-generating module 604 and the various components of the validation module 608 can rely on predicate analysis performed by the predicate analysis module 106. In doing so, these components of the program analysis engine 502 can pass predicates to the predicate analysis module 106, and the predicate analysis module 106 can process the predicates based on the theory of pointers described above.

For example, as said, the backward analysis module 612 analyzes the trace in the backwards direction, e.g., moving from the terminal step in the trace towards the beginning of the trace. In doing so, the backward analysis module 612 attempts to determine, at each step, whether the trace contains a logical contradiction. It performs this task by representing the set of states at each step using a vector of state conditions, referred to as an aggregate condition, which is associated, in turn, with a set of respective predicates. For each step, the backward analysis module 612 calls the predicate analysis module 106 to determine if the corresponding aggregate condition is satisfiable or unsatisfiable. Two outcomes are possible. First, assume that the predicate analysis module 106 determines that the aggregate condition is unsatisfiable. In this case, the backward analysis module 612 has effectively discovered a logical contradiction, and the current set of states cannot possibly lead to the error state. Second, if the predicate analysis module 106 finds that the aggregate condition is satisfiable, the backward analysis module 612 continues with its validation processing, advancing to the next step farther up the trace.

To repeat, the above description of predicate analysis is one example of how a program analysis engine might apply the pointer theory principles described herein. The principles described herein are not limited to the type of program analysis engine 502 shown in FIGS. 5 and 6; nor are the principles limited to CEGAR loop functionality in general.

B. Illustrative Manner of Operation

Figure 7:
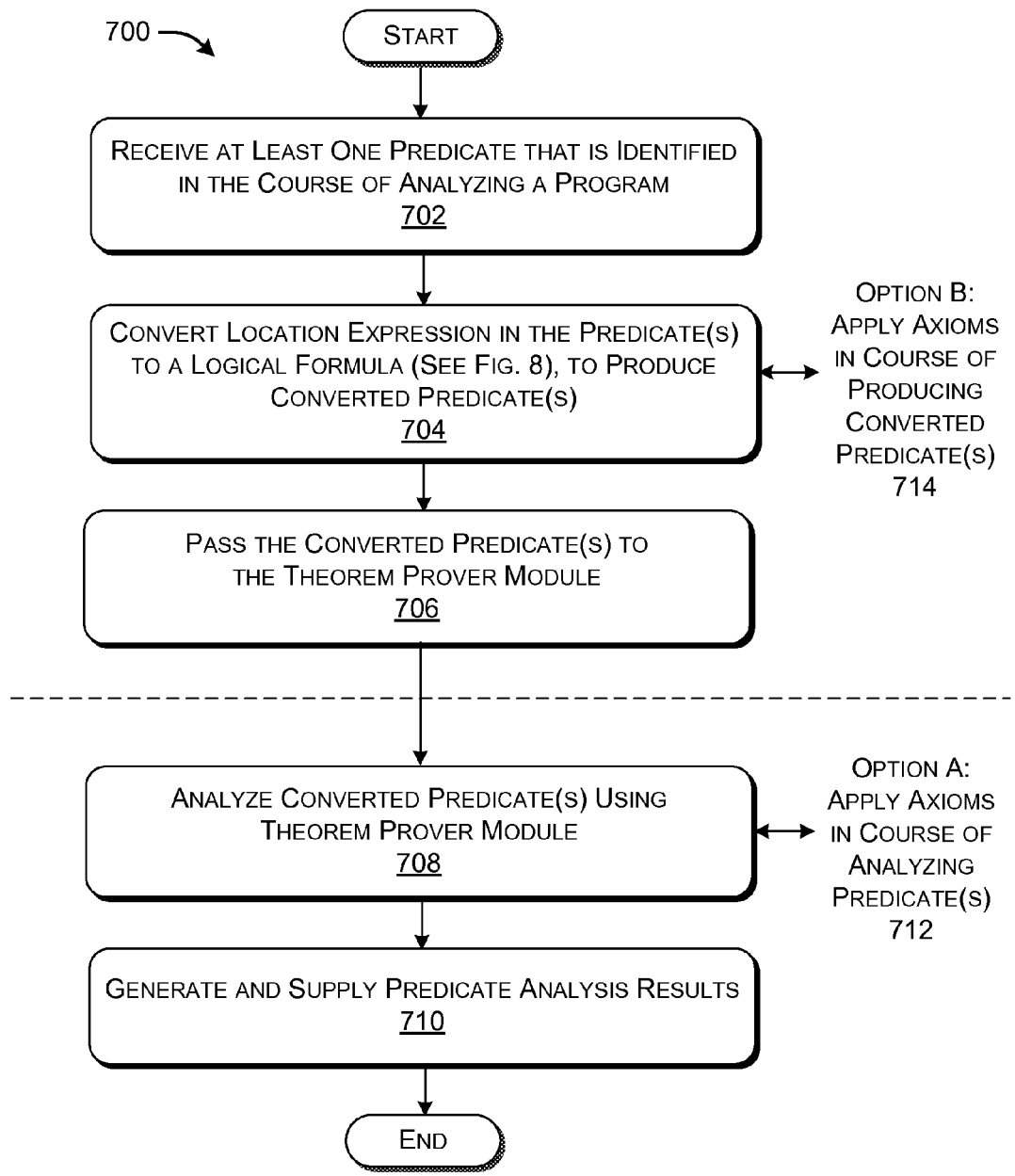
FIG. 7 is a flowchart which provides an overview of one manner of operation of the system of FIG. 1.
Figure 8:
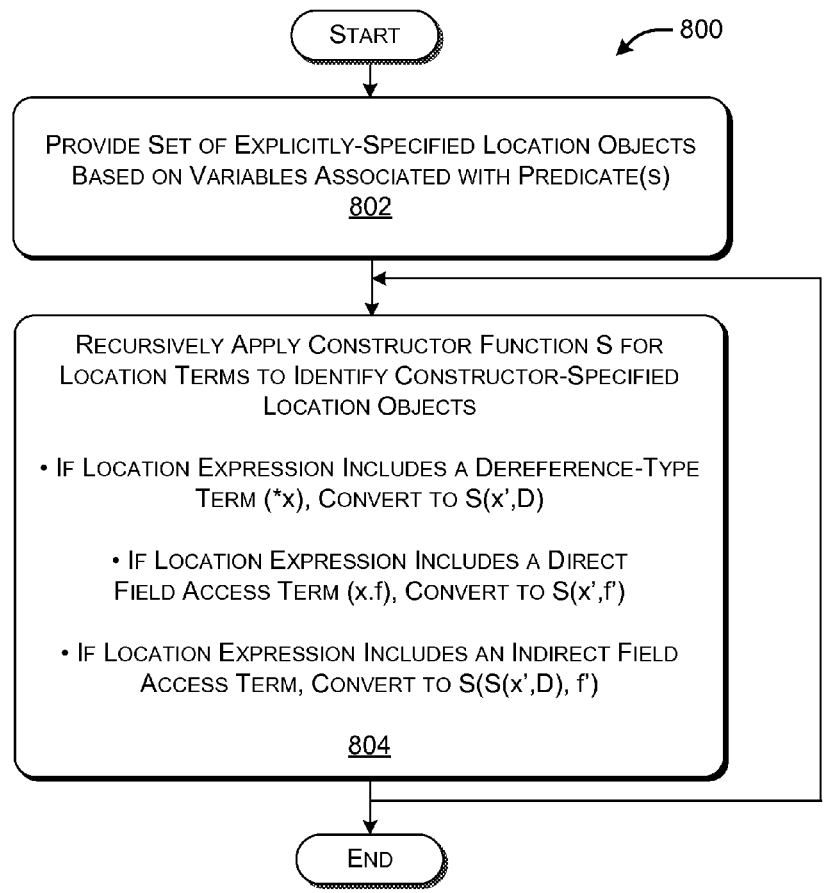
FIG. 8 is a flowchart that describes one manner in which the conversion module can convert location expressions into logical formulae.

FIGS. 7-9 show procedures that explain one manner of operation of the system 100 of FIG. 1. Since the principles underlying the operation of the system 100 have already been described in Section A, some operations will be addressed in summary fashion in this section.

FIG. 7 shows a procedure 700 that presents an overview of the operation of the system 100. This figure shows a dashed line. The conversion module 110 performs the blocks located above the dashed line. The theorem prover module 108 performs the blocks located below the dashed line.

In block 702, the conversion module 110 receives at least one predicate that is identified in the course of analyzing a program.

In block 704, the conversion module 110 converts a location expression in the predicate into a logical formula, using at least one translation rule, to provide a converted predicate.

In block 706, the conversion module 110 passes the converted predicate to the theorem prover module 108, along with other converted predicates.

In block 708, the theorem prover module 108 analyzes the converted predicates, as constrained by a set of axioms.

In block 710, the theorem prover module 108 generates predicate analysis results and supplies those results to the program analysis engine 104.

Block 712 represents mode A of providing the set of axioms to the theorem prover module 108. Here, explicit axioms are supplied to the theorem prover module 108, where these axioms constrain the operation of the theorem prover module 108. Block 714 represents mode B of providing the set of axioms to the theorem prover module 108. Here, the axioms are applied in the course of generating the converted predicates, and, as such, the converted predicates that are fed to the theorem prover module 108 implicitly incorporate the axioms.

FIG. 8 shows a procedure 800 which explains the operation of the conversion module 110 in greater detail.

In block 802, the conversion module 110 provides a set of location objects for the respective variables found in the predicates. These location objects are referred to as basic location objects and are specified in an explicit manner.

In block 804, the conversion module 110 iteratively uses the constructor function S to identify the constructor-specified location objects.

FIG. 9 shows a procedure 900 that represents on implementation-specific formulation of the theory of pointers.

In block 902, the system 100 uses an explicit encoding technique to represent (a) locations associated with variables and (b) field selectors (F), using integers.

In block 904, the system 100 uses an uninterpreted function to represent other entities, e.g., other locations, addresses, and values.

C. Representative Processing Functionality

Figure 10:
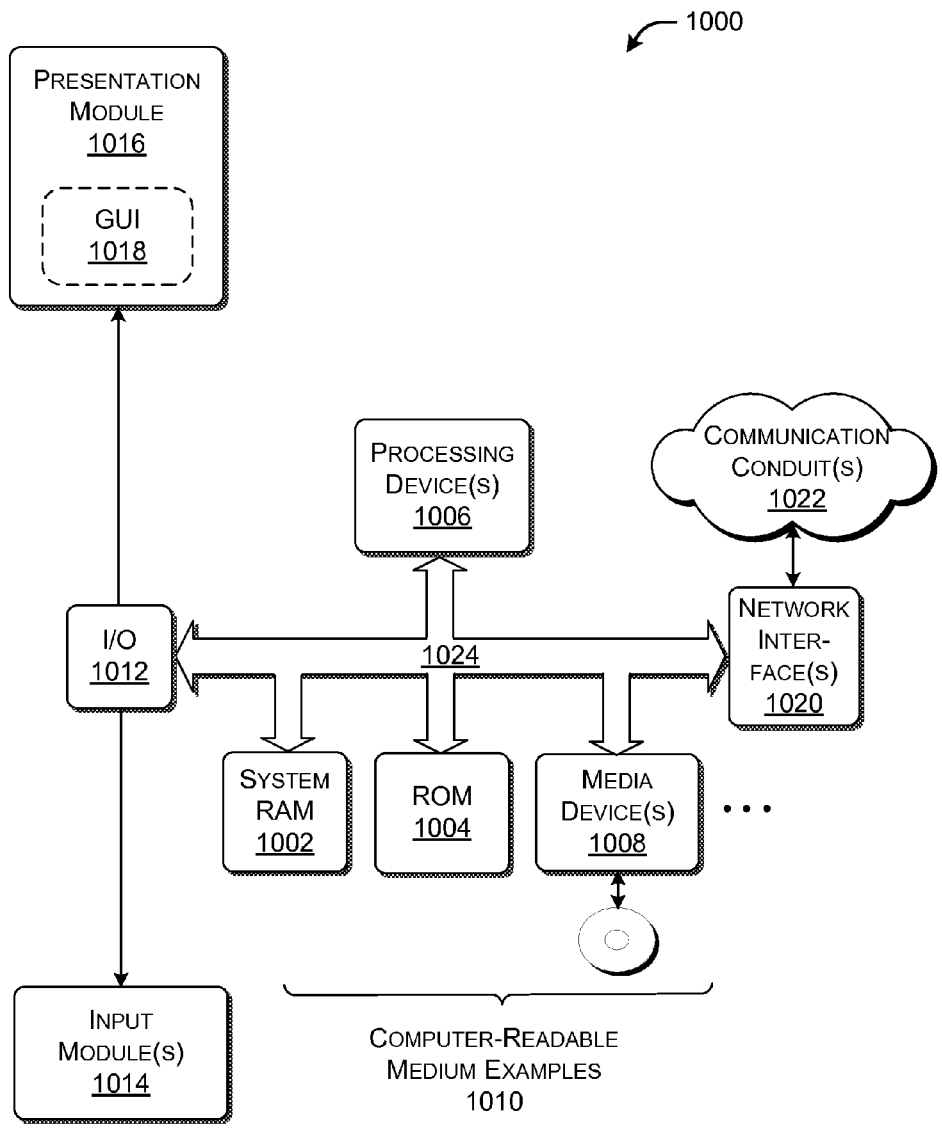
FIG. 10 shows illustrative processing functionality that can be used to implement any aspect of the features shown in the foregoing drawings.

FIG. 10 sets forth illustrative electrical data processing functionality 1000 that can be used to implement any aspect of the functions described above. With reference to FIG. 1, for instance, the type of processing functionality 1000 shown in FIG. 10 can be used to implement any aspect of the system 100, including the program analysis engine 104, the predicate analysis module 106, etc. In one case, the processing functionality 1000 may correspond to any type of computing device that includes one or more processing devices.

The processing functionality 1000 can include volatile and non-volatile memory, such as RAM 1002 and ROM 1004, as well as one or more processing devices 1006. The processing functionality 1000 also optionally includes various media devices 1008, such as a hard disk module, an optical disk module, and so forth. The processing functionality 1000 can perform various operations identified above when the processing device(s) 1006 executes instructions that are maintained by memory (e.g., RAM 1002, ROM 1004, or elsewhere). More generally, instructions and other information can be stored on any computer readable medium 1010, including, but not limited to, static memory storage devices, magnetic storage devices, optical storage devices, and so on. The term computer readable medium also encompasses plural storage devices.

The processing functionality 1000 also includes an input/output module 1012 for receiving various inputs from a user (via input modules 1014), and for providing various outputs to the user (via output modules). One particular output mechanism may include a presentation module 1016 and an associated graphical user interface (GUI) 1018. The processing functionality 1000 can also include one or more network interfaces 1020 for exchanging data with other devices via one or more communication conduits 1022. One or more communication buses 1024 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving, from a program analysis engine, at least one predicate that is identified during analysis of a program, said at least one predicate having a location expression associated therewith that includes pointer information;
    converting, using at least one translation rule, the location expression of said at least one predicate to a logical formula that is interpretable by a theorem prover module, wherein:
        the converting thereby forms at least one converted predicate,
        the logical formula identifies a location object that is associated with an address object and a value object, and
        the address object corresponds to an address of the location object and dereferences to obtain the value object of the location object; and
    passing said at least one converted predicate, including the location object, the address object, and the value object, to the theorem prover module for processing,
    wherein at least the converting is performed by a processing device.

2. The method of claim 1, wherein the location object comprises an explicitly-specified location object that corresponds to a variable in the location expression.

3. The method of claim 1, wherein the location object comprises a constructor-specified location object represented by a constructor function S(X, C), wherein C refers to a link that relates a parent location object X to the constructor-specified location object, wherein the constructor-specified location object corresponds to a location term in the location expression.

4. The method of claim 3, wherein the location term is a dereference-type term, and wherein constructor-specified location object is represented by S(X, D), where D refers to a dereference link.

5. The method of claim 3, wherein the location term is a direct field type access term, and wherein the constructor-specified location object is represented by S(X, F), where F refers to a field index.

6. The method of claim 3, wherein the location term is an indirect field type access term, and wherein the constructor-specified location object is represented by S(S(X, D), F), where D refers to a dereference link and F refers to a field index.

7. The method of claim 1, further comprising:
    using an explicit encoding technique to represent locations associated with variables, and field selectors, as integers; and
    using an uninterpreted function to represent other entities.

8. The method of claim 1, wherein the location object is associated with either a normal location object or an abnormal location object, the abnormal location object representing a invalid location.

9. The method of claim 1, further comprising providing at least one axiom which constrains operation of the theorem prover module.

10. The method of claim 9, wherein said at least one axiom includes at least one function selected from among:
    a function A(X) that identifies the address object of the location object; and
    a function V(X) that identifies the value object of the location object.

11. The method of claim 9, wherein said providing comprises supplying said at least one axiom to the theorem prover module in explicit form, wherein the theorem prover module utilizes said at least one axiom in course of processing said at least one converted predicate.

12. The method of claim 9, wherein said providing comprises applying said at least one axiom in course of said converting of the location expression, wherein said at least one converted predicate that is passed to the theorem prover module implicitly incorporates at least one constraint specified by said at least one axiom.

13. The method of claim 9, wherein said at least one axiom applies to multiple different location objects and is selected from among:
    a first axiom that states that each of the multiple different location objects that is normal has a meaningful corresponding address object;
    a second axiom that states that each of the multiple different location objects is identified by a respective address object;
    a third axiom that states that a constructor function produces non-basic location objects for field-type access terms;
    a fourth axiom that states that other value objects of pointers are equal to other address objects of other location objects obtained through dereference of the pointers;
    a fifth axiom that states that two field-type location objects are identical when the two field-type location objects share a same parent location object and a same link from the same parent location object; and
    a sixth axiom that states that, when two respective parent location objects have equal value objects, then two corresponding child field-type location objects which depend from the two respective parent location objects via another same link also have equal value objects.

14. The method of claim 13, wherein said at least one axiom also includes at least one modified axiom that is derived from at least one of the first through sixth axioms.

15. The method of claim 13, wherein said at least one modified axiom is further selected from among:
   a seventh axiom which includes an inverse function which specifies an inverse operation with respect to a base function that is included in one of the first through sixth axioms;
   an eighth axiom which specifies that a first field-type location object associated with a first parent location object has a corresponding address object which coincides with a first address object of the first parent location object;
   an ninth axiom which specifies, given an individual address object of a first field-type location object, another individual address object of a second field-type location object; and
   a tenth axiom which accommodates use of an array-type access term having an index k that is a variable or a location term.

16. The method of claim 13, wherein the first through sixth axioms represent a core set of axioms, and wherein the theorem prover module is operative to infer additional details based on the core set of axioms.

17. A computer readable memory device or storage device storing computer readable instructions, the computer readable instructions providing a conversion module when executed by one or more processing devices, the computer readable instructions comprising:
   logic configured to use a set of translation rules to convert predicates to converted predicates, wherein the translation rules convert location expressions associated with the predicates to logical formulae of the converted predicates, wherein:
      the logical formulae are interpretable by a theorem prover module,
      the logical formulae identify location objects, and
      the location objects are associated with respective address objects and value objects,
   the logic being operative to provide a set of explicitly-specified location objects corresponding to variables in the location expressions, and then recursively dereference the address objects to identify a set of constructor-specified location objects associated with location terms in the location expressions,
   wherein at least some of the location objects correspond to fields of individual variables.

18. The computer readable memory device or storage device of claim 17, further comprising:
   logic configured to use an explicit encoding technique to represent locations associated with the individual variables and field selectors as integers; and
   logic configured to use an uninterpreted function to represent other entities.

19. A system for analyzing a program, comprising:
   a program analysis engine configured to analyze a program with reference to at least one predicate;
   a conversion module configured to convert, using at least one translation rule, a location expression of said at least one predicate to thereby form at least one converted predicate having a logical formula, the logical formula identifying a location object, the location object being associated with an address object and a value object;
   a theorem prover module configured to process said at least one converted predicate, the theorem prover module configured to interpret said at least one predicate with reference to at least one axiom, said at least one axiom being either explicitly supplied to the theorem prover module or implicitly represented by said at least one converted predicate; and
   at least one processing device configured to execute at least the conversion module,
   wherein said at least one axiom indicates that dereferencing the address object obtains the value object.

20. The system of claim 19, wherein the location object comprises either:
   an explicitly-specified location object that corresponds to a variable in the location expression; or
   a constructor-specified location object that corresponds to a location term in the location expression, wherein the constructor-specified location object is represented by a constructor function $S(X, C)$, wherein C refers to a link that relates a parent location object X to the constructor-specified location object.

* * * * *